(12) United States Patent  
Wang

(10) Patent No.: US 11,974,577 B2  
(45) Date of Patent: May 7, 2024

(54) GYOZA WRAPPER MOLDING MACHINE

(71) Applicant: KAKOSHOKUHIN BOUEKI KABUSHIKI KAISHA, Fukuoka (JP)

(72) Inventor: Shian Wang, Fukuoka (JP)

(73) Assignee: KAKOSHOKUHIN BOUEKI KABUSHIKI KAISHA, Fukuoka (JP)

( * ) Notice: Subject to any disclaimer, the term of this patent is extended or adjusted under 35 U.S.C. 154(b) by 1107 days.

(21) Appl. No.: 16/789,198

(22) Filed: Feb. 12, 2020

(65) Prior Publication Data

US 2020/0267997 A1 Aug. 27, 2020

(30) Foreign Application Priority Data

Feb. 26, 2019 (JP) ................................ 2019-032597

(51) Int. Cl.
*A21C 3/02* (2006.01)
*A21C 11/00* (2006.01)
(Continued)

(52) U.S. Cl.
CPC ............ *A21C 3/025* (2013.01); *A21C 11/008* (2013.01); *A21D 6/001* (2013.01); *A21D 13/30* (2017.01); *A23P 20/20* (2016.08)

(58) Field of Classification Search
None
See application file for complete search history.

(56) References Cited

U.S. PATENT DOCUMENTS 3,883,283 A * 5/1975 Herrera .................... A21C 3/02
425/337
3,999,926 A * 12/1976 Victor .................... A21C 11/00
198/414

(Continued)

FOREIGN PATENT DOCUMENTS

CN          2147743 Y      12/1993
CN       105724502 A  *    7/2016
(Continued)

OTHER PUBLICATIONS

Translation of CN-105724502-A (Year: 2016).*
(Continued)

*Primary Examiner* — Elizabeth M Kerr
(74) *Attorney, Agent, or Firm* — Nakanishi IP Associates, LLC

(57) ABSTRACT

A molding machine 1 is provided, which molds a gyoza wrapper by rolling a gyoza wrapper material lump. A first roller 12 rolls the gyoza wrapper material lump vertically downward to form an approximately elliptical semi-finished product. A direction changing device 30 including a pendulum 31 is positioned vertically below the first roller 12. The pendulum 31 includes a fulcrum portion 314 and an edge receiving portion 311 positioned closer to the central portion side of the first roller 12 than a position immediately below the fulcrum portion 31, which receives the front edge of the semi-finished product. When the semi-finished product is received by the edge receiving portion 311, the pendulum 31 changes the direction of the semi-finished product. A second roller 22 positioned vertically below the first roller 12 then rolls the semi-finished product vertically downward, so as to form a gyoza wrapper.

4 Claims, 5 Drawing Sheets

(51) Int. Cl.
　　　*A21D 6/00*　　　(2006.01)
　　　*A21D 13/30*　　(2017.01)
　　　*A23P 20/20*　　(2016.01)

(56) References Cited

U.S. PATENT DOCUMENTS

| | | | | | |
|---|---|---|---|---|---|
| 4,403,937 | A | * | 9/1983 | Zamparelli | A21C 3/02 |
| | | | | | 425/337 |
| 4,636,164 | A | * | 1/1987 | Bellotto | A21C 11/008 |
| | | | | | 425/367 |
| 4,971,546 | A | * | 11/1990 | Cimenti | A21C 3/02 |
| | | | | | 426/502 |
| 2015/0320055 | A1 | * | 11/2015 | Tao | A21C 1/08 |
| | | | | | 425/306 |

FOREIGN PATENT DOCUMENTS

| | | |
|---|---|---|
| CN | 105724502 A | 7/2016 |
| JP | S43-2079 Y | 1/1968 |
| JP | S50-87192 Y | 7/1975 |
| JP | S61-7571 Y | 3/1986 |
| JP | H02-31930 B | 7/1990 |
| JP | H06-339334 A | 12/1994 |
| JP | H08-84553 A | 4/1996 |
| JP | 4769846 B | 9/2011 |

OTHER PUBLICATIONS

Office Action issued in Chinese Patent Application No. 202010083590.4 dated May 6, 2021, with English Translation (10 pages).

\* cited by examiner

GYOZA WRAPPER MOLDING MACHINE

This application is based upon and claims the benefit of priority from Japanese Patent Application No. 2019-032597 filed on Feb. 26, 2019, the entire disclosure of which, including specification, claims, drawings and summary, is incorporated herein by reference in its entirety.

TECHNICAL FIELD

The present invention relates to a gyoza wrapper molding machine. Also, the present invention relates to a material lump to be used for molding gyoza wrappers.

BACKGROUND ART

Gyoza is a food having a structure in which appropriately finely processed meat, seafood, vegetables, and the like are wrapped with a thin, flat wrapper formed of wheat flour or the like as a material, and then eaten after being baked, boiled, or fried. A gyoza wrapper is required to have a flat surface and a circular shape as viewed in a plan view and to have a thickness that is uniform to some extent. It is difficult to form a gyoza wrapper having such a shape. Accordingly, professional skill is required to form a large number of gyoza wrappers at a constant rate.

In order to support the mass production of such gyoza wrappers, various kinds of manufacturing methods have been proposed. For example, Patent documents 1 through 3 disclose stamping molding of gyoza wrappers in which gyoza wrappers are molded so as to have a gyoza wrapper shape by stamping molding a band-shaped sheet of gyoza wrapper dough. Patent documents 4 and 5 disclose gyoza wrapper molding using a female die provided with a circular cavity. Patent document 6 discloses a molding method for molding gyoza wrapper dough using a first disk and a second disk. Patent document 7 discloses a gyoza wrapper molding machine configured to be capable of adjusting a gap between a pair of facing rollers.

CITATION LIST

Patent Literature

[patent document 1]
Japanese Patent No. 4769846
[patent document 2]
Japanese Examined Utility Model Application Publication No. S61-7571
[patent document 3]
Japanese Examined Utility Model Application Publication No. S43-2079
[patent document 4]
Japanese Examined Patent Publication No. H02-31930
[patent document 5]
Japanese Patent Application Laid Open No. H08-84553
[patent document 6]
Japanese Patent Application Laid Open No. H06-339334
[patent document 7]
Japanese Unexamined Utility Model Application Publication No. S50-87192

SUMMARY OF INVENTION

Technical Problem

In a case in which gyoza wrappers are formed from a band-shaped sheet of gyoza wrapper dough by stamping molding as disclosed in Patent documents 1 through 3, this arrangement requires a mechanism for collecting portions obtained by stamping molding. In addition, this arrangement requires a large amount of gyoza wrapper material to be prepared so as to provide a margin required in stamping molding. In a case in which the gyoza wrappers are molded using the die as disclosed in Patent documents 4 and 5, in some cases, it is difficult to remove the gyoza wrappers from the die. In a case in which an arrangement such as that disclosed in Patent document 6 is applied, an apparatus including a special disk mechanism or the like is required. In addition, the gyoza wrapper molding machines disclosed in Patent documents 1 through 6 relate to a large-size apparatus configured to continuously manufacture gyoza wrappers. In a case of using the molding machine as disclosed in Patent document 7, there is a need to roll a gyoza wrapper raw material multiple times while adjusting the gap between the rollers. Furthermore, there is a need to roll the gyoza wrapper raw material while changing the direction thereof with respect to the rollers.

It is difficult for a kitchen in home or a small restaurant to introduce a large-size apparatus. In addition, there is a low need to manufacture gyoza wrappers with a manufacturing rate supported by such a large-size apparatus. Furthermore, gyoza wrappers readily adhere to each other depending on the composition thereof. This does not allow such gyoza wrappers to be stocked in a stacked state. Accordingly, in some cases, it may not be preferable to manufacture a large number of gyoza wrappers in advance.

The present invention relates to manufacturing of gyoza wrappers each having a uniform thickness and a thin circular shape. In manufacturing of gyoza wrappers according to conventional techniques with a small production scale, such an arrangement requires professional skill. Furthermore, the apparatuses or the like disclosed in Patent documents 1 through 7 have various kinds of problems described above.

In view of such a situation, it is a purpose of the present invention to provide a molding machine configured to be suitable for manufacturing a required number of gyoza wrappers each having a uniform thickness with high efficiency without a need for such professional skill even from a small number of gyoza wrappers.

Also, it is another purpose of the present invention to provide a gyoza wrapper material lump suitable for molding gyoza wrappers by rolling supported by such a molding machine.

Solution of Problem

The present inventor has conducted intensive research to solve the above-described problems. As a result, the present inventor has found that arrangements according to the invention described below are capable of solving the above-described problems, and have arrived at the present invention. That is to say, the present invention relates to arrangements described below.

[A1]

The present invention relates to a molding machine configured to mold a gyoza wrapper by rolling a gyoza wrapper material lump. The molding machine comprises: a first roller configured to roll the gyoza wrapper material lump toward the lower side in the vertical direction so as to form a semi-finished product having an approximately elliptical shape; a direction changing device comprising a pendulum, and arranged on the lower side of the first roller in the vertical direction, wherein the pendulum comprises a fulcrum portion thereof and an edge receiving portion arranged at a position on the lower side of the fulcrum portion of the pendulum in the vertical direction closer to the central portion side of the first roller than a position immediately below the fulcrum portion, and configured to receive a front edge of the semi-finished product, and wherein, when the semi-finished product is received by the edge receiving portion, the pendulum changes the direction of the semi-finished product; and a second roller arranged on the lower side of the first roller in the vertical direction, and configured to roll the semi-finished product with the direction thus changed by the direction changing device toward the lower side in the vertical direction, so as to form a gyoza wrapper.

With the molding machine, the direction changing device changes the direction of the semi-finished product after it is rolled by the first roller. Accordingly, the second roller rolls the semi-finished product with a direction that differs from that when it is rolled by the first roller. With this arrangement, the semi-finished product is rolled in multiple axial directions. This allows the gyoza wrapper to be formed with high efficiency in a simple manner in an elliptical shape or an approximately circular shape having a small difference between the short diameter and the long diameter thereof.

[A2]

The present invention also relates to the molding machine described in [A1]. The pendulum comprises: a stopper portion arranged on the wall side of the first roller, and configured to stop the rotation of the pendulum; and a weight arranged on the lower side of the fulcrum portion in the vertical direction.

By employing the pendulum having such a structure, this arrangement prevents the pendulum included within the direction changing device from excessively rotating after the semi-finished product is received by the edge receiving portion. Furthermore, such an arrangement allows the pendulum to be immediately returned to the standby position after a semi-finished product is fed to the second roller. With this arrangement, the pendulum is set to a suitable position before the next semi-finished product is introduced. This allows the gyoza wrappers to be repeatedly obtained with high efficiency.

[A3]

The present invention also relates to the molding machine described in [A1] or [A2]. The molding machine further comprises a guide portion arranged at a position above the first roller for guiding the gyoza wrapper material lump to an insertion opening.

By employing such a guide portion, the front edge of the semi-finished product obtained by rolling the gyoza wrapper material lump is fed by rolling to the edge receiving portion of the pendulum. This prevents the semi-finished product from passing through without being received by the pendulum. Furthermore, this prevents jamming of the semi-finished product in the pendulum. That is to say, this arrangement allows the direction of the semi-finished product to be changed appropriately.

[A4]

The present invention also relates to the molding machine described in any one of [A1] through [A3]. The molding machine further comprises a rotation mechanism configured to rotate the first roller and the second roller in conjunction with each other.

By employing the rotation mechanism having such a configuration, such a single roller rotation mechanism allows the first roller and the second roller to be rotated in conjunction with each other. This allows the user of the molding machine to obtain gyoza wrappers in a simple operation in which the user drives only a single handle so as to rotate the rollers or the like without any concern about the positions of the gyoza wrapper material lump, the semi-finished product, or the gyoza wrapper in the molding machine.

[A5]

The present invention also relates to the molding machine described in any one of [A1] through [A4]. The molding machine further comprises a body portion including the first roller and the second roller as built-in components. The body portion comprises an insertion port that allows the direction changing device to be detachably inserted in the body portion.

By employing such an insertion port, this arrangement allows the direction changing device to be replaced by another direction changing device in a case in which the direction changing device becomes dirty or in a case in which the size of the pendulum is to be changed as desired according to the size of the gyoza wrapper to be formed. This allows the direction changing device to be replaced. Furthermore, this allows the direction changing device to be cleaned in a detached state.

[B1]

The present invention relates to a gyoza wrapper material lump in a frozen state comprising a kneaded material including wheat flour and water. A notch is included in at least one from among a portion on the circumferential direction of the gyoza wrapper material lump having a disk shape and a portion of a bottom face thereof.

Also, the present invention relates to the gyoza wrapper material lump in a frozen state employed for the molding machine described in any one of [A1] through [A5] described above. The gyoza wrapper material lump comprises a kneaded material including wheat flour and water. A notch is included in at least one from among a portion on the circumferential direction of the gyoza wrapper material lump having a disk shape and a portion of a bottom face thereof.

Such a gyoza wrapper material lump may be preferably employed as a gyoza wrapper material lump to be used for the molding machine as described above after it is thawed. Such a gyoza wrapper material lump is able to be inserted in a state in which the notch is aligned to the edge receiving portion of the pendulum included within the molding machine or otherwise in a state in which the position and the direction are appropriately identified with respect to the guide portion. This allows a gyoza wrapper to be obtained after its direction is appropriately changed. Furthermore, in a case in which the gyoza wrapper material lumps are stored in a frozen state, this arrangement solves a problem in that the gyoza wrapper material lumps have the potential to adhere to each other in a case in which they are stored in a batch in a single container. This allows the gyoza wrapper material lumps to be prepared beforehand, which is advantageous from the distribution viewpoint, and allows the gyoza wrapper lumps to be used immediately after they are thawed.

[B2]

The present invention also relates to the gyoza wrapper material lump described in [B1]. The gyoza wrapper material lump is configured with a weight in a range of 5 to 9 g, a diameter in a range of 20 to 40 mm, and a thickness in a range of 5 to 20 mm.

In particular, such a gyoza wrapper material lump is configured to have a shape and size that are suitable for molding supported by the molding machine as described above. This allows gyoza wrappers each having a suitable size to be obtained with high efficiency.

Advantageous Effects of Invention

The molding machine according to the present invention is capable of manufacturing gyoza wrappers with high efficiency even from a small number of gyoza wrappers. The gyoza wrapper material lump according to the present invention is suitable for the molding supported by the molding machine according to the present invention. Accordingly, the gyoza wrapper material lump according to the present invention is suitable for gyoza wrapper molding with high efficiency in a stable manner.

DESCRIPTION OF EMBODIMENTS

Figure 1:
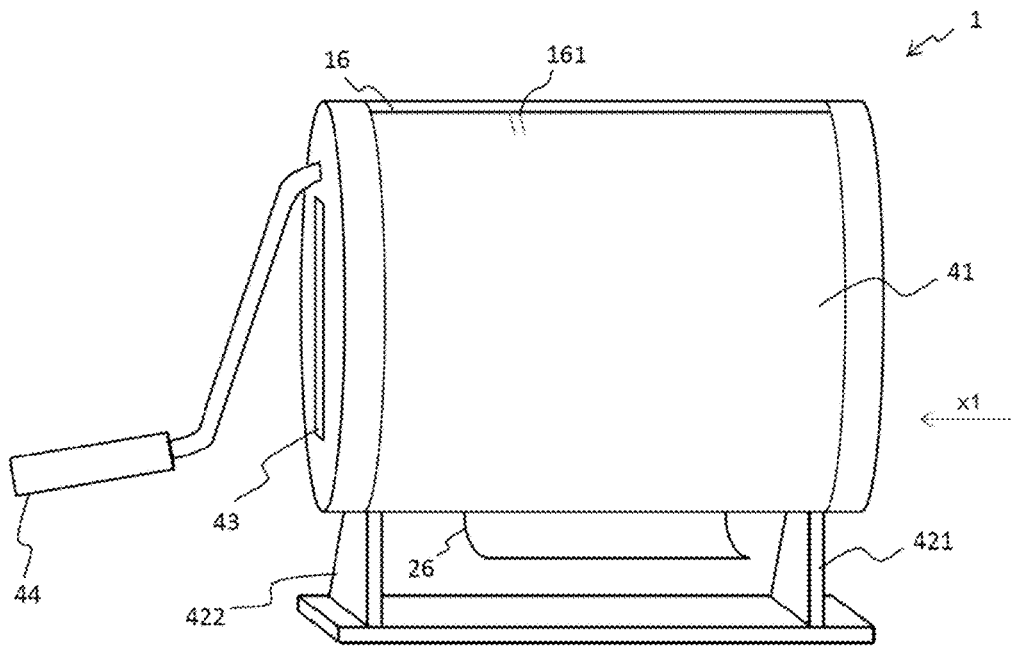
FIG. 1 is an external view of a molding machine according to a first embodiment of the present invention.

Detailed description will be made regarding an embodiment of the present invention. However, description of the constituent features will be made below as an example (typical example) of an embodiment of the present invention. That is to say, the present invention is by no means restricted to the content described below without departing from the scope of the present invention. It should be noted that, in the present specification, the term "through" will be used to represent a range of values including a value that precedes the term and a value that follows the term.

[Molding Machine According to the Present Invention]

The present invention relates to a molding machine configured to mold a gyoza wrapper by rolling a gyoza wrapper material lump. The molding machine comprises: a first roller configured to roll the gyoza wrapper material lump toward the lower side in the vertical direction so as to form a semi-finished product having an approximately elliptical shape; a direction changing device comprising a pendulum, and arranged on the lower side of the first roller in the vertical direction, wherein the pendulum comprises a fulcrum portion thereof and an edge receiving portion arranged at a position on the lower side of the fulcrum portion of the pendulum in the vertical direction closer to the central portion side of the first roller than a position immediately below the fulcrum portion, and configured to receive a front edge of the semi-finished product, and wherein, when the semi-finished product is received by the edge receiving portion, the pendulum changes the direction of the semi-finished product; and a second roller arranged on the lower side of the first roller in the vertical direction, and configured to roll the semi-finished product with the direction thus changed by the direction changing device toward the lower side in the vertical direction, so as to form a gyoza wrapper.

The molding machine according to the present invention is capable of manufacturing gyoza wrappers with high efficiency even from a small number of gyoza wrappers.

[Gyoza wrapper material lump according to the present invention]

The present invention relates to a gyoza wrapper material lump in a frozen state comprising a kneaded material including wheat flour and water. A notch is included in at least one from among a portion on a circumferential direction of the gyoza wrapper material lump having a disk shape and a portion of a bottom face thereof. The gyoza wrapper material lump according to the present invention is suitable for the molding supported by the molding machine according to the present invention. Accordingly, the gyoza wrapper material lump according to the present invention is suitable for gyoza wrapper molding with high efficiency in a stable manner. The gyoza wrapper material lump is fed such that the notch thereof is aligned on the first roller of the molding machine, so as to allow the gyoza wrapper material lump to be guided in a simple manner to a position that corresponds to the edge receiving portion of the pendulum included in the molding machine according to the present invention. This allows the direction of the gyoza wrapper material lump to be changed by the pendulum in a stable manner, thereby facilitating the molding. In particular, in a case in which the molding machine includes a guide portion, by aligning the notch to the guide portion, this arrangement provides stable molding in a simple operation.

It should be noted that, in the present specification, the gyoza wrapper material lump according to the present invention can be employed for the molding supported by the molding machine according to the present invention. That is to say, in the present specification, the corresponding configurations of the molding machine and the gyoza wrapper material lump can be mutually employed.

First Embodiment

Figure 2:
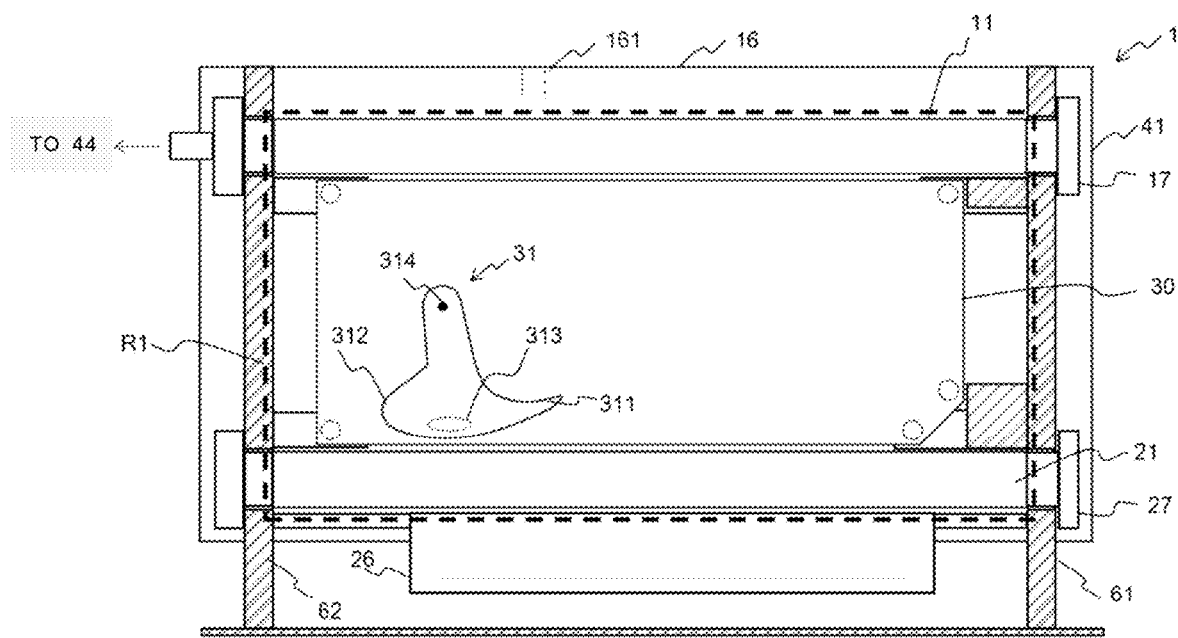
FIG. 2 is a cross-sectional diagram showing the molding machine according to the first embodiment of the present invention.
Figure 3A:
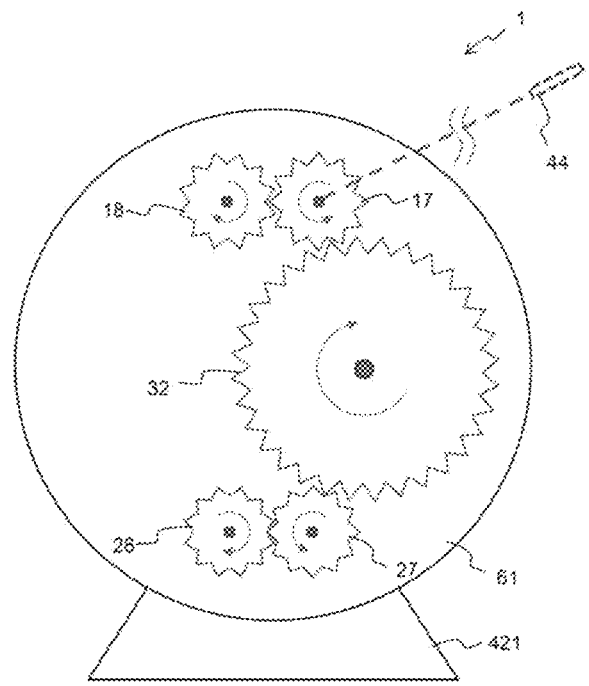
FIGS. 3A and 3B are cross-sectional diagrams showing the molding machine according to the present invention as viewed from another direction.
Figure 3B:
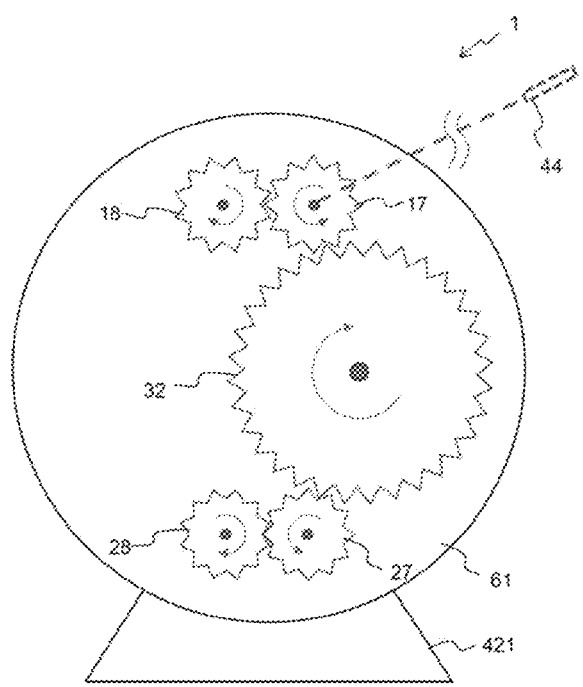

FIG. 1 is a perspective diagram showing a molding machine according to a first embodiment of the present invention. FIG. 2 is a cross-sectional diagram showing a molding machine 1 as viewed from the front side. FIG. 3A is a cross-sectional view of a body portion of the molding machine 1 in the vicinity of the center thereof. FIG. 3B is a cross-sectional view of a rotation mechanism in the vicinity of the right-side wall of the body portion of the molding machine 1.

As shown in FIG. 1, the molding machine 1 has an external configuration including a body portion 41 supported by legs 421 and 422. Furthermore, the molding machine 1 includes an insertion port 43 that allows a direction changing device 30 (see FIG. 2 or the like) to be inserted. Moreover, the molding machine 1 includes a handle 44 that allows first rollers 11 and 12 (see FIG. 2 or the like) and second rollers 21 and 22 (see FIG. 2 or the like) to be rotated. Moreover, the molding machine 1 includes an insertion opening 16 that allows a gyoza wrapping material lump to be inserted. A guide portion 161 is provided to an upper portion of the body portion 41 in order to allow the user to easily identify the position at which the gyoza wrapper material lump is to be inserted into the insertion opening 16. By rotating the handle 44 after the gyoza wrapper dough lump is inserted via the insertion opening 16, this arrangement outputs gyoza wrappers each rolled and molded in the form of a thin circular shape via a lower portion of the body portion 41. It should be noted that the guide portion may be configured as a mark in the form of a line, dot, arrow, or the like, provided to the insertion opening 16. Also, instead of configuring the guide portion 161 as such a mark, other openings that differ from the insertion opening 16 may be closed, thereby allowing the user to be guided.

FIG. 2 is a cross-sectional diagram showing the body portion 41 in the vicinity of the center thereof as viewed from the front side.

The body portion 41 includes, as its internal components, a first roller 11, a direction changing device 30, and a second roller 21 in this order in the vertical direction toward the lower side from the insertion opening 16. A feeding portion 26 is provided below the second roller 21 in the vertical direction. The direction changing device 30 includes a pendulum 31 as a built-in component configured to include an edge receiving portion 311, a stopper portion 312, and a weight 313, and to be supported by a fulcrum portion 314. The first roller 11 and the second roller 21 are each arranged such that they pass through openings provided to side walls 61 and 62, thereby allowing them to be rotated freely with respect to the side walls 61 and 62. A gear 17 is provided to the side wall 61 side end of the first roller 11. A gear 27 is provided to the side wall 61 side end of the second roller 21. A part of the side wall 61 that is lower than the body portion 41 is configured as a part of the leg 421. A part of the side wall 62 that is lower than the body portion 41 is configured as a part of the leg 422.

FIG. 3 is a cross-sectional diagram showing the side face of the molding machine 1 as viewed from the right side indicated by the arrow x1 shown in FIG. 1. FIG. 3A is a cross-sectional view of the body portion 41 in the vicinity of the center thereof. A structure is provided below the insertion opening 16 so as to guide gyoza wrapper material lump to the first rollers 11 and 12. The direction changing device 30 is provided below the first rollers 11 and 12. The second rollers 21 and 22 are provided below the direction changing device 30. The feeder portion 26 is provided below the second rollers 21 and 22.

FIG. 3B is a cross-sectional diagram showing the molding machine 1 in the vicinity of the side wall 61 as viewed from the right side of the side wall 61. The gear 17 is mounted on one end of the first roller 11. The first roller 11 is rotated according to the rotation of the handle 44. A gear 18 is mounted on one end of the first roller 12. Furthermore, a gear 27 is mounted on one end of the second roller 21. A gear 28 is mounted on one end of the second roller 22. In order to transmit the rotation of the gear 17 to the gear 27, a gear 32 is provided between the gears 17 and 27.

The first roller 11 is rotated according to the rotation of the handle 44. The gear 17 provided to the first roller 11 and the gear 18 are arranged such that they mesh with each other. Upon rotating the gear 17, the gear 18 is rotated in the opposite direction to that of the gear 17. This allows the first rollers 11 and 12 to be rotated in opposite directions.

The gears 17 and 32 are arranged such that they mesh with each other. Furthermore, the gears 32 and 27 are arranged such that they mesh with each other. In this state, the gear 17 meshes with the gear 32 such that they face each other. Furthermore, the gear 32 meshes with the gear 27 such that they face each other. With such an arrangement, upon rotating the handle 44 so as to rotate the gear 17, the gear 27 is rotated in the same rotational direction as the gear 17.

The gear 27 provided to one end of the second roller 21 is arranged such that it meshes with the gear 28. As the gear 27 rotates, the gear 28 rotates in a direction that is opposite to that of the gear 27. With this arrangement, the second rollers 21 and 22 rotate in opposite directions. With this gear arrangement, upon rotating the handle 44 in the clockwise direction as viewed from the left side of the molding machine 1 shown in FIG. 1, both the first rollers 11 and 12 rotate in directions so as to provide the feeding toward the lower side. At the same time, both the second rollers 21 and 22 also rotate in directions so as to provide the feeding toward the lower side.

With the molding machine 1, the first rollers 11 and 12 and the second rollers 21 and 22 operate so as to roll and feed a gyoza wrapper material lump or semi-finished product in the same direction. Accordingly, the molding machine 1 can be configured in a simple manner to rotate the gears 17, 18, 32, 27, and 28 in conjunction with each other. Furthermore, by configuring the molding machine 1 such that the gears rotate in conjunction with each other, this arrangement requires the user of the molding machine 1 only to rotate the handle 44 to form the gyoza wrappers from a gyoza wrapper material lump. That is to say, the molding machine 1 provides very high operability in the molding. Furthermore, in order to feed the gyoza wrapper material lump or semi-finished product toward the lower side in the vertical direction, the molding machine 1 allows the user to manually rotate the handle. That is to say, the molding machine 1 requires only a small driving source in use.

A blade 13 is provided at a position in the vicinity of the first roller 11. Furthermore, a blade 14 is provided at a position in the vicinity of the first roller 12. Furthermore, a blade 23 is provided at a position in the vicinity of the second roller 21. Furthermore, a blade 24 is provided at a position in the vicinity of the second roller 22. Powder, lumps, or the like that adhere to each roller are scraped off and removed by the blade thus arranged in the vicinity of the corresponding roller, thereby maintaining each roller in a clean state.

[First rollers 11 and 12]

The first rollers 11 and 12 are configured as a pair of rollers to be rotated in a state in which they face each other. The first rollers 11 and 12 operate so as to roll a gyoza wrapper material lump inserted via the insertion opening 16, and feed it thus rolled toward the lower side in the vertical direction. The gyoza wrapper material lump is rolled such that it has a thickness that corresponds to the width of a gap 15 between the first rollers 11 and 12.

The gap 15 is designed as appropriate according to the thickness of the gyoza wrapper to be formed. For example, the gap 15 is designed to be 1.3 to 2.5 times the thickness of the gyoza wrapper. More specifically, the gap 15 is designed to be a width on the order of 1 mm to 3.5 mm. More preferably, the gap is designed to be a width on the order of 1.5 mm to 3.0 mm.

The length of the first rollers 11 and 12 (in the horizontal direction in FIG. 2) may be designed as appropriate according to the size of the gyoza wrapper. Typically, the gyoza wrapper is formed to have a diameter of 6 cm to 12 cm. Preferably, the gyoza wrapper has a diameter on the order of 7 to 9 cm. Accordingly, the first rollers 11 and 12 may preferably have a length that allows a gyoza wrapper having such a size described above to pass through. So as to enable the direction changing device 30 to change the direction of the semi-finished product of the gyoza wrapper in the direction changing device 30, in consideration of the size of the pendulum 31 and the range of movement thereof in the direction changing device 30, the first rollers 11 and 12 are preferably designed to have a length of approximately 15 cm or more, and are more preferably designed to have a length of 18 cm or more. There is no need to define the upper limit of the length of the rollers 11 and 12 in particular. However, in a case in which the rollers 11 and 12 have an excessively large length, this leads to a problem in that the molding machine 1 has a large weight. In some cases, this leads to a problem of poor operability. Accordingly, the rollers 11 and 12 may be designed to have a length of 30 cm or less or of 25 cm or less. In a stage in which the gyoza wrapper material lump passes through the gap between the first rollers 11 and 12, the gyoza wrapper material lump has a small width. Accordingly, the first rollers 11 and 12 may be designed to have a smaller length than that of the second rollers 21 and 22. Also, the first rollers 11 and 12 may be designed to have the same length as that of the second rollers 21 and 22. In a case in which the first and second rollers are designed to have the same or a similar length, such an arrangement provides improved manufacturing efficiency and improved operability for rotating the rollers.

In the molding machine 1, the first rollers 11 and 12 are each configured using a cylindrical member. The diameter of each cylindrical member is not restricted in particular. Rather, the diameter of each cylindrical member may be determined as appropriate according to the material thereof. For example, each cylindrical member is designed to have a diameter on the order of 10 mm to 30 mm, for example.

By employing such a configuration in which the first rollers 11 and 12 are configured as a pair of rollers that face each other, this arrangement allows the gyoza wrapper material lump to be rolled and fed in a state in which a uniform force is applied from both sides of the gyoza wrapper material lump. This arrangement provides a semi-finished product with a uniform thickness, thereby providing stable molding of the gyoza wrappers. Furthermore, this arrangement allows the gyoza wrapper material lump to be inserted in a stable state. Moreover, this arrangement allows the semi-finished product to be fed in a stable state.

[Second Rollers 21 and 22]

The second rollers 21 and 22 are configured as a pair of rollers that rotate in a state in which they face each other. The second rollers 21 and 22 roll a semi-finished product input after it has passed through the direction changing device 30. Subsequently, the second rollers 21 and 22 feed the semi-finished product thus rolled toward the lower side in the vertical direction. The semi-finished product is rolled to have a thickness that corresponds to the width of the gap 25 between the second rollers 21 and 22.

The gap 25 is designed as appropriate according to the thickness of the gyoza wrapper to be formed. For example, the gap 25 may be designed to be on the order of 0.5 mm to 2 mm. More preferably, the gap 25 may be designed to be on the order of 0.8 mm to 1.5 mm. The gap 25 corresponds to the thickness of the gyoza wrapper.

The second rollers 21 and 22 may be configured to have a length that corresponds to the length of the first rollers 11 and 12. Furthermore, by configuring the second rollers 21 and 22 as a pair of rollers in the same manner as the first rollers 11 and 12, this arrangement allows the semi-finished product to be molded in a stable manner by rolling so as to have a uniform thickness, thereby providing stable molding. It should be noted that the materials of the first rollers 11 and 12 and the second rollers 21 and 22 are not restricted in particular. The first and second rollers may each be formed of a metal material, a wood material, resin material, or the like. In a case in which the first and second rollers are each be formed of a metal material, a SUS material may be preferably employed so as to suppress the occurrence of rust.

[Direction Changing Device 30]

The direction changing device 30 includes a pendulum 31 as a built-in component configured to include an edge receiving portion 311, a stopper portion 312, and a weight 313, and to be supported by a fulcrum portion 314. The direction changing device 30 is configured to have an internal space defined by a pair of plate members arranged to have a gap 33 with spacers arranged at corners thereof, and including the pendulum 31 within the internal space in a state which it is held by the fulcrum portion 314. The pendulum 31 is configured such that it can be swung with the fulcrum portion 314 as the center. The direction changing device 30 is arranged between the pair of the first rollers 11 and 12 and the pair of the second rollers 21 and 22. The direction changing device 30 is configured as a cartridge-type component that can be inserted via the insertion port 43 as desired. With such an arrangement configured to allow the direction changing device 30 to be detachably inserted, this allows a suitable device to be inserted for use according to the size of the gyoza wrapper to be formed. Also, such an arrangement allows the direction changing device 30 to be detached for cleaning, replacement, or the like. In many cases, it is difficult to clean the internal components of the direction changing device 30. Accordingly, waste readily remains in the internal space of the direction changing device 30 after a semi-finished product or the like passes through. With such an arrangement configured to allow the direction changing device 30 to be detachably inserted, this arrangement facilitates cleaning and replacement. In addition, in a case in which the direction changing device 30 is detached, such an arrangement also functions as an apparatus for manufacturing a strip-shaped noodle belt by rolling.

[Pendulum 31]

The pendulum 31 is mounted such that its fulcrum portion 314 is held by the plate members that form the direction changing device 30. Specifically, the pendulum 31 is held by means of a rotational pin such that it can be swung as a pendulum.

The edge receiving portion 311 is arranged below the fulcrum portion 314, and is configured to have an arc shape that protrudes from the first roller 11 side toward the second roller 21 side, and from the center c0 (see FIG. 4) toward the side wall 62 side in the direction dl (see FIG. 4). By configuring the edge receiving portion 311 to have such a shape, the pendulum 31 is configured to have an arc shape such that its edge receiving portion 311 side is concave toward the first roller 11 side. With such an arrangement, the semi-finished product thus rolled is fed to a concave arc-shaped structure of the pendulum 31 without the occurrence of interference between them above the pendulum 31.

The edge receiving portion 311 is configured such that it extends toward the center side of the first roller 11 from the lower side of the fulcrum portion 314 defined in the vertical direction so as to receive the front edge of the rolled semi-finished product at a position below the fulcrum portion 314. The edge receiving portion 311 is configured such that it is curved toward its front end from the lower side of the fulcrum portion 314 defined in the vertical direction. Also, the edge receiving portion 311 may be provided with a strongly curved portion in the form of a hook having a size on the order of 1 to 5 mm.

The stopper portion 312 is arranged on the lower side of the fulcrum portion 314 in the vertical direction, and is configured on the opposite side of the edge receiving portion 311. The stopper portion 312 may be configured to have an arc shape that protrudes toward the side wall 62 side in the direction dl. When the pendulum 31 receives the semi-finished product 512 within the direction changing device 30, the pendulum 31 swings such that it retracts toward the side wall 62 side. In order to allow the pendulum 31 to swing in a satisfactory range, the stopper portion 312 is preferably configured to have a length that is smaller than that of the edge receiving portion 311 in the side wall 62 direction. Furthermore, in order to prevent excessive rotation, the stopper portion 312 is configured to have a shape that protrudes toward the side wall 62. This arrangement provides a balance between the stopper portion 312 and the edge receiving portion 311 even in a case in which the stopper portion 312 is configured to have a small length.

The weight 313 is provided below the fulcrum portion 314 in the vertical direction. The weight 313 is provided in order to allow the pendulum 31 to easily return to a predetermined position. The weight 313 may be configured as a member embedded in the pendulum 31, and configured as a member heavier than those that form the pendulum 31. Also, the weight 313 may be configured as a portion having a large thickness.

Detailed description will be made with reference to FIG. 4 regarding the flow of the direction changing operation for the semi-finished product, employed in the molding machine 1. FIG. 4 is an enlarged diagram of a region R1 (region surrounded by the broken line in FIG. 2) with the first roller 11, the direction changing device 30, and the second roller 21 shown in FIG. 2 as the main components. It should be noted that the first rollers 12 and 11 rotate as a roller pair, and the second rollers 22 and 22 rotate as a roller pair, so as to roll and feed the gyoza wrapper material lump or the semi-finished product. However, description will be made below with reference to FIG. 4 in which the first roller 12 and the second roller 22 are not shown.

Figure 4A:
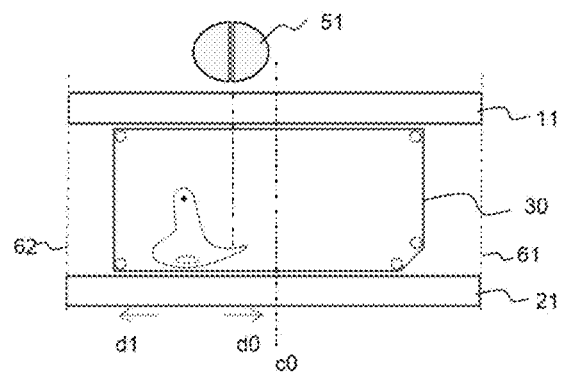
FIGS. 4A, 4B, 4C, 4D and 4E are diagrams for explaining the flow of direction changing supported by the molding machine according to the first embodiment of the present invention.
Figure 7A:
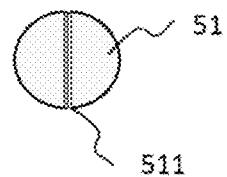
FIGS. 7A, 7B, 7C, 7D, 7E, 7F, 7G and 7H are diagrams showing gyoza wrapper material lumps according to the present invention.
Figure 7B:

As shown in FIG. 4A, first, an approximately spherical or disk-shaped gyoza wrapper material lump 51 is inserted from the insertion opening 16 (FIG. 1) provided above the first roller 11. The guide portion 161 (FIG. 1) is configured as a mark that indicates the position immediately above a portion in the vicinity of the edge receiving portion 311 so as to allow a front edge 5121 of the semi-finished product 512 to be received by the edge receiving portion 311 of the pendulum 31 in a simple manner. The gyoza wrapper material lump 51 is inserted such that a notch (see FIG. 7B) provided to the gyoza wrapper material lump 51 faces the guide portion 161.

Figure 4B:
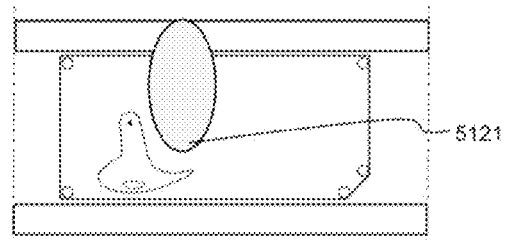

As shown in FIG. 4B, by rotating the first roller 11, the gyoza wrapper material lump 51 is rolled and fed according to the rotation of the first roller 11. The semi-finished product 512 thus rolled is fed such that its front edge portion 5121 is received by the edge receiving portion 311 of the pendulum 31. That is to say, the edge receiving portion 311 of the pendulum 31 prevents the front edge portion 5121 of the semi-finished product 512 from passing through and being received by the second roller 21 without change, and prevents the semi-finished product 512 from being formed as a strip-shaped rolled body.

Figure 4C:
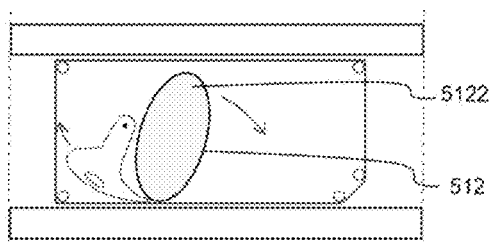

As shown in FIG. 4C, after the gyoza wrapper material lump 51 is rolled by the first roller 11, the semi-finished product 512 is received by the front edge receiving portion 311 of the pendulum 31. When the semi-finished product 512 is received by the front edge receiving portion 311, the pendulum 31 swings in the form of an arc with the fulcrum portion 314 as its center due to the weight of the semi-finished product 512 such that it retracts toward the side wall 62 in the direction d1. When the lower end side of the pendulum 31 swings toward the side wall 62 side, the semi-finished product 512 is turned as a reaction, in the form of an arc in the clockwise direction on the same plane in FIG. 4C, such that its rear end 5122 faces the side wall 62 side, thereby changing the direction thereof by approximately 90 degrees. It should be noted that the pendulum 31 is provided with the stopper portion 312 on the opposite side of the front edge receiving portion 311, i.e., on the side wall 62 side in a direction away from the center of the body portion 41. When the pendulum 31 largely swings, the stopper portion 312 comes in contact with the side wall 62 or a casing of the direction changing device 60, which prevents the excessive rotation of the pendulum 31.

Figure 4D:
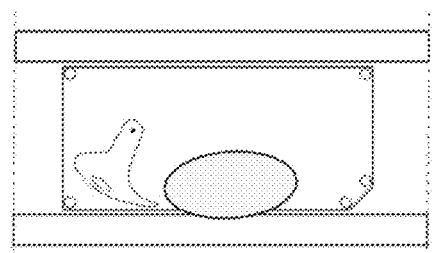

As shown in FIG. 4D, the direction of the semi-finished product 512 is changed as a reaction to the swing of the pendulum 31 in the form of an arc. As a result, the semi-finished product 512 has a direction in which the short-diameter direction of the semi-finished product 512 having an approximately elliptical shape matches the vertical direction. In this stage, the semi-finished product 512 is input to the second roller 21 in a state in which its long-diameter direction matches the horizontal direction and its short-diameter direction matches the vertical direction. It should be noted that the notch provided to the gyoza wrapper material lump 51 is rolled such that it is filled with the surrounding portions of the dough sheet, thereby smoothing the edge to a satisfactory level in which such a notch is inconspicuous even if it is observed visually.

Figure 4E:
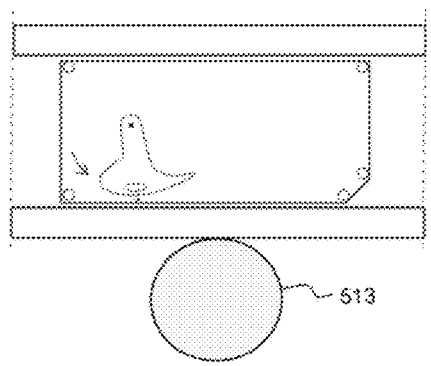

As shown in FIG. 4E, the second roller 21 rolls the semi-finished product 512 in a direction in which the short-diameter direction of the semi-finished product 512 matches the vertical direction. By rolling the semi-finished product 512 in this direction, the semi-finished product 512 is rolled such that it extends in the short-diameter direction, thereby providing a gyoza wrapper 513 having an approximately circular shape.

When the semi-finished product 512 is received by the edge receiving portion 311, the pendulum 31 swings such that it retracts toward the side wall 62 side. After the semi-finished product 512 is rolled and fed by the second roller 21, the direction changing device 30 becomes empty. In such a state in which the direction changing device 30 is empty, the pendulum 31 provided with the weight 313 is moved due to gravity such that the weight 313 is positioned below the fulcrum portion 314 in the vertical direction. In this stage, the edge receiving portion 313 of the pendulum 31 is returned to a standby position where the direction of the semi-finished product is changed when it is inserted.

The thickness of each gyoza wrapper is adjusted as appropriate in a range on the order of 0.5 mm to 2.5 mm. The thickness corresponds to the gap 25 between the second rollers 21 and 22. Accordingly, in a case of changing the thickness, the gap 25 between the second rollers 21 and 22 or otherwise the gap 15 between the first rollers 11 and 12, which are an upstream stage of the second roller pair, is preferably changed. Accordingly, the molding machine 1 may be configured to have an adjusting mechanism for adjusting the gap 15 or 25.

Typically, the gyoza wrapper is configured to have a diameter in a range of approximately 6 cm to 12 cm, and preferably on the order of 7 to 9 cm. After the semi-finished product 512 passes through the first rollers 11 and 12, the semi-finished product 512 has a long diameter that is approximately equal to or similar to the gyoza wrapper diameter described above. Accordingly, the distance (L1) between the first roller pair 11 and 12 and the second roller pair 21 and 22 in the vertical direction is designed to be larger than the size of each gyoza wrapper to be formed. Specifically, the distance (L1) is preferably designed to be 3 cm or more larger than the size of the gyoza wrapper, and is more preferably designed to be 5 cm or more larger than the size of the gyoza wrapper. The upper limit of the distance (L1) is not set in particular. However, in a case in which the distance (L1) is excessively large, such an arrangement has the potential to cause a problem of the semi-finished product being deformed such that it folds before it reaches the second roller pair 21 and 22. Accordingly, the upper limit of the distance (L1) may be set to 15 cm or less or 10 cm or less.

When the semi-finished product 512 is input to the direction changing device 30 in a state in which it has separated from the first roller pair 11 and 12, the direction thereof is changed. Accordingly, the length (L2) of the direction changing device 30 is designed to be larger than the size of the gyoza wrapper to be formed.

Specifically, the length (L2) is preferably designed to be 1 cm or more larger than the size of the gyoza wrapper, and is more preferably designed to be 3 cm or more larger than the size of the gyoza wrapper. The upper limit of the length (L2) is not set in particular. However, in a case in which the length (L2) is excessively large, such an arrangement has the potential to cause a problem in that the semi-finished product is deformed such that it folds before it reaches the second roller pair 21 and 22. Accordingly, the upper limit of the distance (L2) may be set to 10 cm or less or 8 cm or less.

Furthermore, the direction changing device 30 is preferably designed to have a structure that allows the semi-finished product 512 to be input via a gap between a pair of plate members. Moreover, the pair of plate members are preferably provided with the fulcrum portion of the pendulum 31. By passing the semi-finished product 512 through the gap between the plate member pair, such an arrangement allows the semi-finished product 512 to be guided to the second roller pair 21 and 22 while maintaining its shape even in a case in which the semi-finished product 512 has a small thickness that has the potential to cause a problem of it folding after it passes through the first roller pair 11 and 12. The gap 33 between the plate member pair of the direction changing device 30 may be designed to allow the semi-finished product 512 to be easily guided. For example, the gap 33 may be designed to be on the order of 5 mm to 15 mm.

Figure 5:
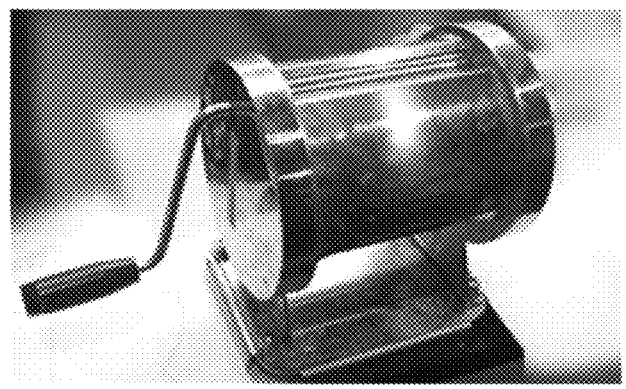
FIG. 5 is an image showing an example of the molding machine according to the present invention.

FIG. 5 is a photo of an example design of the molding machine according to the present invention. This molding machine has a configuration that corresponds to that of the molding machine 1 according to the first embodiment described above, which has a function of rolling a gyoza wrapper material lump so as to form a gyoza wrapper. This molding machine is configured such that the gap between the first roller pair is set to 2 mm, a direction changing device having a pendulum is arranged, and the gap between the second roller pair is set to 1 mm.

Figure 6:
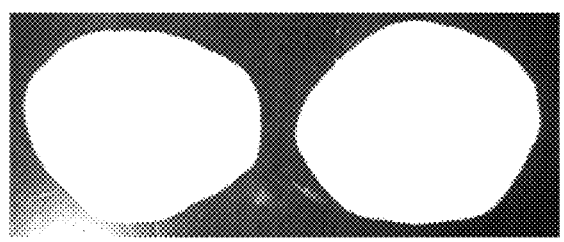
FIG. 6 is an image showing an example of gyoza wrappers molded by the molding machine according to the present invention.

FIG. 6 shows an example of the gyoza wrappers formed by the molding machine shown in FIG. 5. The gyoza wrappers were each formed using a kneaded material obtained by kneading water and wheat flour (all-purpose flour) with a mass ratio of 50:50. The kneaded material of approximately 8 g is molded in a spherical shape. Furthermore, the kneaded material thus molded in a spherical shape is pressed on opposing faces so as to form a gyoza wrapper material lump in a disk shape having a large thickness. Subsequently, the gyoza wrapper material lump is input to the insertion opening of the molding machine, following which the handle is rotated. As a result, the gyoza wrapper material lump is rolled and molded after it passes through the first rollers, the direction changing device, and the second rollers. The gyoza wrapper thus molded has a diameter on the order of approximately 8 cm, and has an approximately circular shape with a small difference between the short diameter and long diameter thereof. Upon pressing the edge portions of the gyoza wrapper thus formed after given ingredients are wrapped in it, this allows the edge portions to be adhered to each other using the fingers in a simple manner. Such a gyoza thus formed can be cooked by baking, boiling, frying, or steaming and eaten without substances separating or the like. Such a gyoza wrapper is formed of only water and wheat flour, which results in a springy texture for delicious gyoza.

It should be noted that the user is only required to fold the gyoza wrapper thus rolled to adhere the folded portions thereof to each other after a certain period of time. The molding machine according to the present invention is capable of producing a required number of gyoza wrappers as desired in a simple manner. This arrangement is preferably employed to form such gyoza wrappers having the nature of adhering to each other. In an undesired case in which gyoza wrappers are adhered to each other, a suitable amount of a gyoza wrapper material lump may be preferably formed again by re-forming the gyoza wrappers that have adhered to each other. By rolling the gyoza wrapper material lump thus formed, such an arrangement allows the gyoza wrappers to be immediately formed.

[Gyoza Wrapper Material Lump]

The gyoza wrapper material lump according to the present invention is configured as a frozen gyoza wrapper material lump including a kneaded material containing wheat flour and water and provided with a notch to at least a portion thereof on the circumferential direction of the disk-shaped gyoza wrapper material lump and/or a portion on the bottom thereof. The gyoza wrapper material lump can be used to mold a gyoza wrapper after it is thawed from the frozen state. Such a gyoza wrapper material lump is preferably molded by the molding machine according to the present invention. Typically, there is no need to provide such a notch to such a material lump state for molding a gyoza wrapper. Giving consideration to the potential to cause deformation, in many cases, the gyoza wrapper material lump is formed to have a smooth edge. However, with such an arrangement in which the gyoza wrapper material lump is formed to have such a notch, gyoza wrapper molding is performed in a state in which the notch is aligned in the vertical direction with the upper portion of the edge receiving portion of the pendulum included in the molding machine according to the present invention. This allows the gyoza wrappers to be formed stably in a simpler manner.

In a case in which the gyoza wrapper material lumps are stored in a refrigerated state or at room temperature, in some cases, they adhere to each other. However, in a case in which the gyoza wrapper material lumps are stored in a frozen state, this prevents them from adhering to each other. This allows the user to store such gyoza wrapper material lumps each of which can be used to form a gyoza wrapper that provides high convenience and high adhesivity in wrapping an ingredient.

The "disk-shaped" gyoza wrapper material lump has a shape that is similar to a circle as viewed in a plan view. The disk-shaped gyoza wrapper material lump is not necessary formed in a perfectly circular shape as viewed in a plan view. Rather, the overall shape of the disk-shaped gyoza wrapper material lump may be an approximately circular shape including a line or an arc. Also, the disk-shaped gyoza wrapper material lump may be formed such that, as viewed in a side view, it has a thickness that is large in the vicinity of the central portion thereof, and that may gradually decrease closer to both edges which are the circumferential portion thereof.

The notch is provided to at least a portion of the disk-shaped gyoza wrapper material lump on the circumferential direction and/or a portion on the bottom face thereof. That is to say, the notch may be provided to only a portion of the disk-shaped gyoza wrapper material lump on the circumferential direction. Also, the notch may be provided to only a portion on the bottom face of the disk-shaped gyoza wrapper material lump. It should be noted that the disk-shaped gyoza wrapper material lump can be easily turned over. Accordingly, both the upper face and the lower face each surrounded by the side circumferential face will be referred to as the "bottom face". A notch may be provided to only one from among the bottom faces, or may be provided to each of the bottom faces, each of which are included in a state in which a notch is provided to a portion of the bottom face. Also, the notch may be provided to both a portion of the disk-shaped gyoza wrapper material lump on the circumferential direction and a portion on the bottom face thereof. Also, the notch provided to a portion of the disk-shaped gyoza wrapper material lump on the circumferential direction and the notch provided to a portion on the bottom face thereof may be configured as a continuous notch, an intermittent notch, or discontinuous notches. Various kinds of notches may be employed so long as such a notch is configured as a mark that indicates the direction or the position of the gyoza wrapper material lump to be guided to the guide portion or the like when the gyoza wrapper molding is performed by the molding machine according to the present invention. For example, such a notch may be provided in the form of a groove such that it passes through in the vicinity of a central portion on the bottom face of the gyoza wrapper material lump.

FIG. 7 is a diagram showing example shapes of the gyoza wrapper material lump. FIGS. 7A and 7B are diagrams each showing a gyoza wrapper material lump 51. FIG. 7A is a plan view of the gyoza wrapper material lump 51. FIG. 7B is a front view of the gyoza wrapper material lump 51. The gyoza wrapper material lump 51 is provided with a notch 511 at approximately the center position on the bottom face of the gyoza wrapper material lump 51. The gyoza wrapper molding is performed in a state in which the notch 511 is aligned to the guide portion 161 provided to the molding machine 1. With such an arrangement, after the gyoza wrapper material lump 51 is rolled, the front edge portion 5121 of the semi-finished product 512 is received by the edge receiving portion 311 of the pendulum 31 in a stable manner. The direction of the semi-finished product 512 is changed by the pendulum 31, following which the semi-finished product 512 is rolled, thereby forming a gyoza wrapper having an approximately circular shape in a stable manner without a need for a professional skill or experience. As shown in FIG. 7B, the notch 511 is provided to only the upper-side bottom face in the form of a groove such that it passes through the central portion thereof.

Figure 7C:
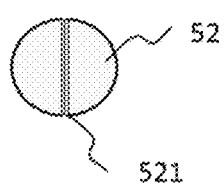
Figure 7D:
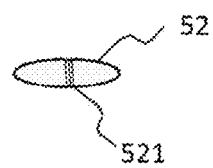

FIGS. 7C and 7D are diagrams each showing a gyoza wrapper material lump 52. FIG. 7C is a plan view of the gyoza wrapper material lump 52. FIG. 7D is a front view of the gyoza wrapper material lump 52. The gyoza wrapper material lump 52 is provided with a notch 521 in a circumferential manner such that it passes through the centers of both bottom faces of the gyoza wrapper material lump 52. The notch is provided such that it passes through a circumferential face of the thickness-direction portion of the disk-shaped gyoza wrapper material lump 52 having a large thickness. As described above, the notch 521 is provided in a linear shape to the central portion. The gyoza wrapper material lump 52 is inserted such that the direction of the notch 521 thereof is aligned in the vertical direction with the guide portion 161 of the molding machine 1, so as to perform the gyoza wrapper molding. This allows the gyoza wrapper to be molded in a very stable manner.

Figure 7E:
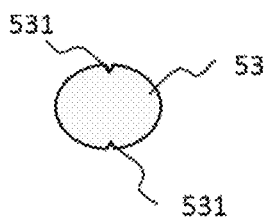
Figure 7F:
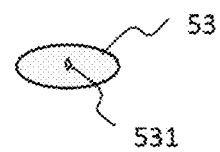

FIGS. 7E and 7F are diagrams each showing a gyoza wrapper material lump 53. FIG. 7E is a plan view of the gyoza wrapper material lump 53. FIG. 7F is a front view of the gyoza wrapper material lump 53. The gyoza wrapper material lump 53 is formed such that notches 531 are respectively provided to two portions that are opposite to each other on the circumferential face of the disk-shaped gyoza wrapper material lump 53. In a case in which the gyoza wrapper molding is performed by means of the molding machine 1, the user of the molding machine 1 supplies the gyoza wrapper material lump in a state in which the vertical line defined by the notches 531 provided to the gyoza wrapper material lump 53 is aligned with the guide portion 161, so as to perform the gyoza wrapper molding. This allows the gyoza wrappers to be formed in a more stable manner.

Figure 7G:
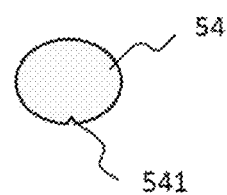
Figure 7H:
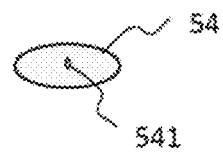

FIGS. 7G and 7H are diagrams each showing a gyoza wrapper material lump 54. FIG. 7G is a plan view of the gyoza wrapper material lump 54. FIG. 7H is a front view of gyoza wrapper material lump 54. The gyoza wrapper material lump 54 is formed such that a single notch 541 is provided to a given position on the circumferential face of the gyoza wrapper material lump 54. The gyoza wrapper molding is performed in a state in which the notch 541 is aligned to the guide portion 161 of the molding machine 1. This arrangement allows the front edge portion of the semi-finished product 512 to be received by the edge receiving portion 311 of the pendulum 31 in a stable manner after the gyoza wrapper material lump 54 is rolled. Subsequently, after the direction of the semi-finished product 512 is changed by the pendulum 31, the semi-finished product 512 is rolled. This allows the gyoza wrapper to be formed in an approximately circular shape without a need for professional skill or experience.

The gyoza wrapper material lump according to the present invention is configured as a kneaded material obtained by mixing and kneading wheat flour and water. The wheat flour and water are preferably mixed with a mixture ratio on the order of (45 to 55):(55 to 45). Such materials are mixed and kneaded so as to form a so-called dough, which is a kneaded material having elasticity. The kneaded material may be manufactured including an additive agent or the like in order to season the gyoza wrapper, to provide improved preservation, or the like. The ratio of wheat flour and water in the kneaded material ((mass of wheat flour+mass of water)/(mass of the kneaded material)×100) is preferably set to 95% by mass or more. Furthermore, the ratio is more preferably set to 98% by mass or more. Moreover, the ratio is more preferably set to 99% by mass or more. Also, the kneaded material may be substantially formed of only wheat flour and water. With a larger ratio of wheat flour and water in the kneaded material, it becomes easier for the gyoza wrapper to be adhered. Specifically, a gyoza can be immediately closed simply by pressing the folded edges thereof in a state in which a given ingredient is wrapped by the gyoza wrapper.

In a case in which a large number of gyoza wrappers are manufactured, there is a need to provide a process for preventing the gyoza wrappers from adhering to each other. In order to solve such a problem, in some cases, an adhesion preventing agent is applied to each gyoza wrapper. However, such an arrangement causes a problem of a change in flavor. Furthermore, such an arrangement has a problem of it being difficult to adhere the folded edges of the gyoza wrapper when a given ingredient is wrapped by the gyoza wrapper. This requires an additional step in which the edge of the gyoza wrapper is moistened with water so as to adhere the gyoza wrapper edges, which is troublesome. In a case in which the gyoza wrapper (dough) is formed of only wheat flour and water, such a gyoza wrapper (dough) is delicious. However, in a case in which a number of gyoza wrappers are stacked in a stretched state, they adhere to each other as described above. Accordingly, as a high-efficiency method, a required amount or required number of gyoza wrappers may be preferably formed every time gyoza is to be formed. It should be noted that the gyoza wrapper material lump according to the present invention may be formed to be substantially free of either an adhesion preventing agent or a release agent. As such a gyoza wrapper material lump formed to be substantially free of either an adhesive preventing agent or a release agent, the upper limit of the content of such an adhesive preventing agent or a release agent may be controlled to be 1% by mass, 0.5% by mass, 0.1% by mass, or the like.

The gyoza wrapper material lump may be formed as a frozen gyoza wrapper material lump as follows. That is to say, dough is molded in the form of the gyoza wrapper material lump, and the gyoza wrapper material lump thus formed is frozen. With the frozen gyoza wrapper material lump, the shape thereof is stable when it is stored. Furthermore, this prevents gyoza wrapper material lumps from adhering to each other. Gyoza wrapper material lumps may be frozen in a separated state such that they are not in contact with each other in order to maintain the gyoza wrapper material lump shape. A notch may be formed in each gyoza wrapper material lump in molding before freezing. Also, such a notch may be formed in each gyoza wrapper material lump after freezing.

The gyoza wrapper material lump according to the present invention is preferably formed to have a weight of 5 to 9 g. More preferably, the weight of each gyoza wrapper material lump is preferably set to 5.5 to 8.5 g. In particular, the weight of each gyoza wrapper material lump is preferably set to 6 to 8 g. In a case in which the gyoza wrapper material lump is formed to have such a weight, this allows the gyoza wrapper to be formed with a suitable size in a simple manner. Also, the gyoza wrapper material lump according to the present invention is preferably configured to have a diameter of 20 to 40 mm. In a case in which the gyoza wrapper material lump is formed to have such a diameter, this allows the user to easily insert it into the molding machine. Furthermore, this arrangement allows the gyoza wrapper to be formed with a uniform thickness by rolling in a simple manner. Moreover, such gyoza wrapper material lumps can be stored with reduced bulk. Also, the gyoza wrapper material lump according to the present invention is preferably configured to have a thickness of 5 to 20 mm. It should be noted that the thickness is defined as the largest linear distance between both bottom faces thereof. By pressing a given spherical gyoza wrapper material, the gyoza wrapper material lump is formed in a disk shape having a large thickness that is smaller than its diameter. By further pressing approximately flat portions of the gyoza wrapper material lump by rolling, this arrangement allows the gyoza wrapper to be formed in a simple manner. The gyoza wrapper material lump is formed as a kneaded material mainly including wheat flour and water. The size of the gyoza wrapper material lump has a large effect on the size and the thickness of the gyoza wrapper itself. In many cases, a large number of gyoza wrappers are produced at the same time. However, in a case in which a suitable amount of each gyoza wrapper material lump is measured and taken from a kneaded material, such a step is troublesome depending on the number of the gyoza wrapper material lumps to be used in a kitchen in home or a small restaurant. Furthermore, such a step in which a suitable amount of each gyoza wrapper material lump is measured and taken manually is affected by large individual differences in skills. In some cases, a large period of time is required to obtain such a skill. In contrast, by employing the gyoza wrapper material lump according to the present invention, this arrangement is capable of solving such a problem. That is to say, this arrangement allows a suitable amount of a gyoza wrapper material lump to be obtained with high efficiency.

INDUSTRIAL APPLICABILITY

The molding machine and the gyoza wrapper material lump according to the present invention are applicable to gyoza wrapper manufacturing in a restaurant or the like, which is advantageous from an industrial viewpoint.

REFERENCE SIGNS LIST 1 molding machine;
11, 12 first roller;
13, 14, 23, 24 blade;
15, 25, 33 gap;
16 insertion opening;
161 guide portion;
17, 18, 27, 28, 32 gear;
21, 22 second roller;
26 feeding portion;
31 pendulum;
311 edge receiving portion;
312 stopper portion;
313 weight;
314 fulcrum portion;
41 body portion;
421, 422 leg;
43 insertion port;
44 handle;
51, 52, 53, 54 gyoza wrapper material lump;
511, 521, 531, 541 notch;
512 semi-finished product;
5121 front edge;
5122 rear edge;
513 gyoza wrapper.

The invention claimed is:
1. A molding machine configured to mold a gyoza wrapper by rolling a gyoza wrapper material lump, the molding machine comprising:
a first roller configured to roll the gyoza wrapper material lump toward a lower side in a vertical direction so as to form a semi-finished product having an approximately elliptical shape;
a direction changing device comprising a pendulum, and arranged on a lower side of the first roller in the vertical direction, wherein the pendulum comprises a fulcrum portion thereof and an edge receiving portion arranged at a position on a lower side of the fulcrum portion of the pendulum in the vertical direction closer to a central portion side of the first roller than a position immediately below the fulcrum portion, and configured to receive a front edge of the semi-finished product; and a second roller arranged on the lower side of the first roller in the vertical direction, and configured to roll the semi-finished product with the direction thus changed by the direction changing device toward the lower side in the vertical direction, so as to form a gyoza wrapper, wherein:

the fulcrum portion of the pendulum comprises a shaft part, and the edge receiving portion of the pendulum extends from a tip of the fulcrum portion, wherein the tip of the fulcrum portion is distal to a center of rotation of the pendulum;

the center of rotation of the pendulum remains at a fixed position while the pendulum rotates;

a rotation axis of the first roller and a rotation axis of the second roller are held mutually in parallel, having a space between the first roller and the second roller, such that the pendulum is disposed within the space between the first roller and the second roller; and when the semi-finished product is received by the edge receiving portion, the pendulum rotates thereby changing a direction of the semi-finished product by 90 degrees.

2. The molding machine according to claim 1, wherein the pendulum comprises:

a stopper portion arranged on an opposite side of the edge receiving portion with the fulcrum portion interposed in the vertical direction, and configured to have an arc shape that protrudes toward a side wall of the molding machine to stop a rotation of the pendulum; and a weight arranged on a lower side of the fulcrum portion in the vertical direction.

3. The molding machine according to claim 1, further comprising a guide portion arranged at a position above the first roller for guiding the gyoza wrapper material lump to an insertion opening.

4. The molding machine according to claim 1, further comprising a rotation mechanism that includes one or more gears configured to rotate the first roller and the second roller in conjunction with each other; and a body portion including the first roller and the second roller as built-in components, wherein the body portion comprises an insertion port that allows the direction changing device to be detachably inserted in the body portion.

* * * * *